United States Patent [19]

Toratani et al.

[11] Patent Number: 5,053,165

[45] Date of Patent: Oct. 1, 1991

[54] GLASS OF IMPROVED THERMAL SHOCK RESISTANCE FOR HIGH AVERAGE POWER SOLID STATE LASER SYSTEM

[75] Inventors: Hisayoshi Toratani, Tokyo, Japan; Yeong Lin, Sunnyvale; Helmuth E. Meissner, Pleasanton, both of Calif.

[73] Assignees: Hoya Optics, Inc., Fremont, Calif.; Hoya Corporation, Tokyo, Japan

[21] Appl. No.: 385,122

[22] Filed: Jul. 26, 1989

[51] Int. Cl.$^5$ .................. C03C 3/17; C03C 3/19
[52] U.S. Cl. .................. 252/301.4 P; 252/301.6 P; 501/47; 501/48
[58] Field of Search .......... 252/301.48, 301.6 P; 501/47, 48

[56] References Cited

U.S. PATENT DOCUMENTS

| | | | |
|---|---|---|---|
| 4,075,120 | 2/1978 | Myers et al. | 501/47 |
| 4,239,645 | 12/1980 | Izumitani et al. | 501/47 |
| 4,248,732 | 2/1981 | Myers et al. | 501/47 |
| 4,820,622 | 4/1989 | Izumitani et al. | 501/73 |
| 4,875,920 | 10/1989 | Myers | 501/45 |
| 4,883,523 | 11/1989 | Lee et al. | 65/30.14 |

FOREIGN PATENT DOCUMENTS

| | | |
|---|---|---|
| 0356746 | 3/1990 | European Pat. Off. |
| 3340968 | 5/1984 | Fed. Rep. of Germany |
| 61-215233 | 9/1986 | Japan |
| 2-28525 | 6/1990 | Japan |

*Primary Examiner*—Mark L. Bell
*Attorney, Agent, or Firm*—Sughrue, Mion, Zinn, Macpeak & Seas

[57] ABSTRACT

A phosphate based laser glass composition for high average power systems including by mol percent 60–66% $P_2O_5$, 6–9% $Al_2O_3$, 8–12% $Li_2O$, 0–15% MgO, 0–15% ZnO, 0–5% $B_2O_3$ and 0.1–4%, $Nd_2O_3$, with MgO+ZnO totaling 14–16%.

5 Claims, No Drawings

GLASS OF IMPROVED THERMAL SHOCK RESISTANCE FOR HIGH AVERAGE POWER SOLID STATE LASER SYSTEM

BACKGROUND OF THE INVENTION

Since the discovery of advantages of phosphate base laser glass over silicate base glass, several neodymium doped laser glass compositions with a phosphate matrix have been reported in various patents such as U.S. Pat. Nos. 4,075,120, 4,248,732, 4,239,645, and 4,333,848. The general emphasis of those glasses on high stimulated emission cross section, good optical quality and chemical durability have resulted in laser glasses beneficial to the purpose of generating high peak power output.

The laser glasses of U.S. Pat. No. 4,075,120 are generically described as comprising, in mole percent 35.0 to 65.0% $P_2O_5$; 0.01 to 15.0% $R_2O_3$ ($Al_2O_3$, $La_2O_3$, $Y_2O_3$, $Tm_2O_3$, $B_2O_3$, $Er_2O_3$ and mixtures thereof); 5.0 to 30.0% RO (alkali earth metal oxides. disclosing BaO, BeO, MgO, SrO, CaO and mixtures thereof): 5.0 to 40.0% $R_2O$ (alkali metal oxides including $Li_2O$, $K_2O$, $Na_2O$, $Rb_2O$ and mixtures thereof) and 0.01 to 7.0% of an oxide of a trivalent rare earth ion, ($Nd_2O_3$, $Sm_2O_3$, $Yb_2O_3$, $Dy_2O_3$, $Pm_2O_3$, $Tm_2O_3$, $Er_2O_3$, $Ho_2O_3$, $Tb_2O_3$). In the specific glass formulations disclosed in this patent. $Li_2O$ when present is used in a very large amount (minimum of 25.0 mol % in Example XIII, while $Al_2O_3$ when present is used in 5 mol % or less. Naturally, the high $Li_2O$ content necessarily reduces $P_2O_5$ maximum, with a high up 55 mol % $P_2O_5$ used when $Li_2O$ and $Al_2O_3$ are in the same glass.

U.S. Pat. No. 4,248,732 is a continuation-in-part of U.S. Pat. No. 4,075,120. ZnO is added as another RO possibility. Example XXVIII includes lowered $Li_2O$ content (15.0 mol %), but also reduced $P_2O_5$ (50.0 mol. %) due to high ZnO content (30.0 mol %)

U.S. Pat. No. 4,333,848 generally describes laser glasses comprising in mole percent, 55 to 70% $P_2O_5$; 3 to 15% alkali metal oxide (preferably $Li_2O$ plus $K_2O$ with 6 to 12% $Li_2O$ stated to be a preferred embodiment); 10 to 30% BaO, 0 to 15% CaO and 0 to 15% SrO with total RO concentration of 20 to 28%; 0.5 to 5% $Al_2O_3$; 0.5 to 11% $Nd_2O_3$ and 1 to 5% solarization inhibitor (stated to be $Sb_2O_3$, $Nb_2O_3$ and $SiO_2$). The specific glass formulating examples of this patent, when including $Li_2O$ within the preferred range, employ relatively low levels of $Al_2O_3$ (say 2.5%) and only BaO and CaO as RO components.

U.S. Pat. No. 4,239,645, assigned to one of the assignees hereof, generically describes laser glasses comprising, in mole percent, 55 to 70% $P_2O_5$ 1-15% $Al_2O_3$ (preferably 4-10); 10-25% $Li_2O$, $Na_2O$ and/or $K_2O$ (preferably 9-15% $Li_2O$, 4-10% $Na_2O$); 5-15% BaO. ZnO, CaO, SrO and/or MgO (preferably 5-12% of total of CaO, MgO, $CaF_2$ and $MgF_2$); 0.01-5% $Nd_2O_3$, and various optional oxides. This patent includes sixty-three examples, most of which include alkali metal oxide, especially $Na_2O$ in large amounts, and without regulation of alkaline earth metal oxide content by amount and selection of oxide.

For the purpose of some laser systems such as Inertial Confinement Fusion (ICF) which investigates the fusion of hydrogen isotopes to helium, the above mentioned glasses have been found to be quite useful because an extremely high peak power is required for this fusion reaction. The pulse repetition frequency is very low for this application, usually only one pulse per several hours. Thermal shock resistance of the glass developed for this application (ICF) does not need to be and is not very high.

For more practical applications, the pulse repetition frequency is expected to be much higher than for the ICF application. A high average power output instead of high peak power output becomes the top priority. In order to generate high average power output, the lasing substance must be able to operate at high pulse repetition frequency at a relatively high pulse energy. The maximum pulse repetition frequency f for a slab laser can be determined by $$f = \frac{12R}{t^2 px}$$

wherein R is the so-called thermal shock resistance parameter, t is the thickness, p is the peak stored energy density, and x is the ratio of thermal energy deposited in the material to peak optical energy stored in the material. This indicates that the maximum pulse repetition frequency depends on a thermal shock resistance parameter R.

The thermal shock resistance parameter R is normally evaluated by the equation of $$R = \frac{SK(1 - V)}{\alpha E}$$

wherein S is the maximum permissible surface tensile stress, K is the thermal conductivity, V is Poisson ratio, $\alpha$ is the linear thermal expansion coefficient and E is the Young's modulus. For brittle materials such as glass, the maximum tensile stress S is an extrinsic property that depends more strongly on the type and size of surface defects than on the intrinsic strength. For comparison of one material with another a more appropriate intrinsic fracture toughness $K_{IC}$ is used instead of S (Marion, J. E., *J. Appl. Phys.* 62(5), 1595 (1987)). The intrinsic thermal shock resistance parameter R' can be represented by the equation of $$R' = \frac{K_{IC}K(1 - V)}{\alpha E}$$

This invention relates to the composition of a phosphate based laser glass with strong thermal shock resistance for use in high average power applications. Glasses of the present invention have R' values of 0.9–1.02 $W/m^{\frac{1}{2}}$. Representative phosphate base laser glasses described in the preceding patents have R' value around 0.5–0.7 $W/m^{\frac{1}{2}}$, while a more desirable R' value for glasses for use in high average power applications is at least 0.9 $W/m^{\frac{1}{2}}$.

For the purpose of high average power output application, any platinum particle inclusion from the melting crucible tends to cause a thermal fracture. Laser glass with compositions in the silicate or silica-phosphate system usually has a higher R' value over phosphate glass. Unfortunately, those glasses have been found to be too difficult to manufacture without any platinum inclusion because of their slow dissolution rate of platinum. Such is the problem that has existed with an earlier glass of Japanese Patent Application No. 60-53424, published as 61-215233. The present glass is based on a phosphate matrix with high platinum solubility and therefore may be manufactured without such inclusions.

In general laser material should have a high gain coefficient in order to obtain a high laser output efficiency. The gain coefficient g of a laser medium is related to the stimulated emission cross section $\sigma$ as in the following equation $$g = (W_p N_t T_f) \sigma$$

wherein $W_p$ is the pumping rate, $N_t$ is the ionic concentration of lasing element, $T_f$ is the fluorescence lifetime. It indicates that the gain coefficient is proportional to the stimulated emission cross section. Glasses that have cross sections of at least $3.4 \times 10^{-20}$ cm$^2$ at 1.05 $\mu$m, are desired for normal high average power application.

SUMMARY OF THE INVENTION

An object of this invention is to provide a laser glass suitable for high average power laser application.

More specifically, an object of this invention is to provide a laser glass for high average power laser applications characterized by strong thermal shock resistance.

Another object of this invention is to provide a laser glass suitable for high average power laser applications possessing relatively low thermal expansion coefficient and relatively high emission cross-section values.

Still another object of this invention is to provide a laser glass for high average power laser applications which can be produced of high optical homogeneity and without or with reduced platinum inclusions.

The above and other objects of this invention, as will be apparent from the Detailed Description Of The Invention hereinafter, have been attained by providing a phosphate-base laser glass of the following composition (in mol %):

| | |
|---|---|
| 60–66% | $P_2O_5$ |
| 6–9% | $Al_2O_3$ |
| 8–12% | $Li_2O$ |
| 0–15% | MgO |
| 0–15% | ZnO |
| 0–5% | $B_2O_3$ |
| 0.1–4% | $Nd_2O_3$, | with the sum of MgO plus ZnO being 14–16%.

In one embodiment of the invention, up to 2% $Al_2O_3$ may be replaced by $La_2O_3$, $Y_2O_3$, $Nb_2O_5$ (or combinations thereof). In another embodiment of the invention, up to 3% $Li_2O$ may be replaced by $Na_2O$ or $K_2O$ (or combinations thereof). In still another embodiment of the invention, up to 5% (MgO+ZnO) may be replaced by CaO, SrO or BaO (or combinations thereof), with the sum of all alkaline earth oxides plus ZnO between 14–16%. These embodiments can be used in combinations of two of them or all of them can be used in a single glass formulation.

DETAILED DESCRIPTION OF THE INVENTION

Laser glass suitable for high average power applications (i.e., output at 1.05 $\mu$m) requires the absence of platinum particle inclusion (from platinum-containing crucibles), strong thermal shock resistance and high stimulated emission cross section. The glasses of this invention provide these attributes.

The phosphate-based laser glasses of this invention are characterized by an emission cross section greater than $3.4 \times 10^{-20}$ cm$^2$, preferably $3.4 \times 10^{-20}$ cm$^2$ to $3.8 \times 10^{-20}$ cm$^2$ (at 1.05 $\mu$m) and a thermal expansion coefficient less than $94 \times 10^{-7}/°$ C. between 100°–300° C., preferably less than $90 \times 10^{-7}/°$ C. As may be seen from the equation of R', a lower thermal expansion coefficient would be always better, with =o resulting in R'= $\infty$, i.e., a very thermally shock resistant glass.

In addition, to ensure glass of high optical homogeneity from the melting operation, i.e., stability against devitrification, the glass compositions of this invention exhibit glass transition temperature $T_G$ to liquidus temperature $L_T$ ratios of 0.43 or higher, preferably 0.45 or higher. Furthermore, the glass matrices of this invention possess high platinum solubility so that glass without platinum inclusion can be made.

Variation of each component of the aforesaid composition affects a certain modification of glass character. The effect and content limitation of each component have been thoroughly investigated and are explained in the following paragraphs.

Higher concentration of $P_2O_5$ causes larger amount of weight loss during the melting process because of its higher volatility. It causes higher viscosity and higher liquidus temperature. Casting good quality glass from it becomes difficult especially when it reaches more than 75 mol %. Lowering of $P_2O_5$ concentration results in better stability against devitrification. However, it causes the detrimental effects of decreasing stimulated emission cross section $\sigma$ and increasing thermal expansion coefficient $\alpha$.

The preferred concentration of $P_2O_5$ is at least 63 mol % for this invention.

The total amount of alkali metal oxides of $Li_2O$, $Na_2O$ and $K_2O$ in the present laser glass is defined to be 8–12 mol %, with at most 3 mol % thereof being $Na_2O$ and/or $K_2O$. As the amount of alkali oxide in the present glass composition is increased beyond 12 mol %, its linear thermal expansion coefficient tends to become too high for high average power application of this glass. If the total amount thereof is lower than 5 mol %, the emission cross section becomes too low.

Total amount of divalent oxides of MgO, CaO, ZnO, SrO, and BaO for this invention is 14–16 mol %, with at most 5 mol % thereof being CaO, SrO and/or BaO. The employment of smaller alkaline earth ions in this glass has advantages of decreasing thermal expansion and increasing thermal stability but it has a detrimental effect of reducing emission cross section.

Higher mol % of ZnO over alkaline earth oxide tends to decrease thermal expansion with little effect on emission cross section. However, it should not exceed 15 mol %, since the high content of this component is accompanied with a reduction of stability against devitrification. 5–10 mol % ZnO is preferred for the present glass.

The mol % ratio of total alkali oxides and divalent oxides in this present glass is preferred to be in the range of 0.5–0.8 with optimum range of 0.6–0.7. When the ratio is greater than 0.8, its thermal expansion coefficient becomes too high, and viscosity becomes very low which causes difficulty in casting the glass with good optical quality. When the ratio is less than 0.4, its emission cross section becomes too small.

The amount of $Al_2O_3$ employed in this glass is 6–9 mol %. Higher content of this component tends to reduce both emission cross section and thermal expansion coefficient.

Higher concentration of $Al_2O_3$ also increases liquidus temperature and viscosity of the glass. Up to 2 mol % of $Al_2O_3$ may be replaced by either $La_2O_3$, $Gd_2O_3$, $Y_2O_3$, $Nb_2O_5$, or a combination of them. This replacement has an effect of lowering liquidus temperature at the cost of decreasing emission cross section and increasing thermal expansion.

Concentration range of the active lasing component, $Nd_2O_3$, is defined to be 0.1 mol %–4 mol % for this invention. When this concentration is less than 0.1 mol %. its very low radiation output makes it unsuitable for the purpose of this invention. When the concentration is greater than 4 mol %, the high ionic density causes a self quenching effect and it also makes it unsuitable for its intended applications.

$B_2O_3$ slightly increases stability, but it reduces emission cross section values.

EXAMPLE

For the preparation of the phosphate laser glasses of this invention, the components were sufficiently mixed in quantities to provide a test melt of about 130 g. The well mixed batches were melted over about 1.5 hours in a platinum crucible of about 70 ml capacity. During the melting process, the melt was stirred twice with a quartz rod by hand. Melting was done at 1320° C., fining for 20 minutes and casting into a small graphite mold were done at 1340° C. Glass compositions and properties are set forth in Table 1, wherein $\alpha$ is linear thermal expansion coefficient (x $10^{-7}/°$ C. between 100°–300° C., $T_G$ is glass transition temperature, $L_T$ is liquidus temperature, and $\sigma$ is emission cross section ($10^{-20}$ cm$^2$).

of the $Nd_2O_3$ or $Al_2O_3$ of melt composition 61 to lower liquidus temperature.

Variations of the invention will be apparent to the skilled artisan.

What is claimed:

1. A phosphate base laser glass consisting essentially of in mol percent

60–66% $P_2O_5$
6–9% $Al_2O_3$
8–12% $Li_2O$
0–15% MgO
0–15% ZnO
0–5% $B_2O_3$
0.1–4% $Nd_2O_3$, with the sum of MgO plus ZnO being 14–16% wherein up to 2% $Al_2O_3$ may be replaced by $La_2O_3$, $Gd_2O_3$, $Y_2O_3$, $Nb_2O_5$ or combinations thereof; up to 3% $Li_2O$ may be replaced by $Na_2O$, $K_2O$ or combinations thereof; and up to 5% MgO plus ZnO may be replaced by CaO, SrO, BaO or combinations thereof, and wherein the glass has an emission cross section greater than $3.4 \times 10^{-20}$ cm$^2$ and a thermal expansion coefficient less than $94 \times 10^{-4}/°$ C. between 100°–300° C.

2. The phosphate base laser glass of claim 1 wherein the emission cross section is within $3.4 \times 10^{-20}$ to $3.8 \times 10^{-20}$ cm$^2$ and the thermal expansion coefficient is less than $90 \times 10^{-7}/°$ C.

3. The phosphate base laser glass of claim 1 having a $T_G$ (glass transition temperature) to $L_T$ (liquidus temperature) ratio of at least 0.43.

4. The phosphate base laser glass of claim 3 wherein the ratio is at least 0.45.

5. The phosphate base laser glass of claim 1 being

TABLE 1

| Glass Compositions (in mol %) and Properties | | | | | | | | | | | | | |
|---|---|---|---|---|---|---|---|---|---|---|---|---|---|
| Example No. | 1 | 2 | 3 | 4 | 5 | 6 | 7 | 8 | 9 | 10 | 11 | 12 | 13 |
| Melt No. | 34 | 35 | 36 | 37 | 38 | 42 | 44 | 45 | 46 | 56 | 61 | 72 | 74 |
| $P_2O_5$ | 65 | 65 | 65 | 65 | 65 | 65 | 63 | 61 | 61 | 61 | 65 | 65 | 65 |
| $Li_2O$ | 10 | 10 | 10 | 10 | 10 | 10 | 10 | 10 | 12 | 10 | 10 | 10 | 10 |
| $Na_2O$ | — | — | — | — | — | — | — | — | — | — | — | — | — |
| MgO | 5 | 15 | 10 | 5 | — | 5 | — | — | — | — | 5 | 5 | 5 |
| RO | BaO 5 | — | — | — | — | CaO 5 | — | — | — | — | — | — | — |
| ZnO | 5 | — | 5 | 10 | 15 | 5 | 15 | 15 | 15 | 15 | 10 | 10 | 10 |
| $Al_2O_3$ | 7 | 7 | 7 | 7 | 7 | 7 | 7 | 7 | 7 | 6 | 8 | 7 | 6 |
| $La_2O_3$ | 1 | 1 | 1 | 1 | 1 | 1 | 1 | 1 | 1 | 1 | 1 | — | 1 |
| $R_2O_3$ | — | — | — | — | — | — | $B_2O_3$ 2 | $B_2O_3$ 4 | $B_2O_3$ 2 | $N_2O_3$ 5 | — | $Y_2O_3$ 1 | $Y_2O_3$ 1 |
| $Nd_2O_3$ | 2 | 2 | 2 | 2 | 2 | 2 | 2 | 2 | 2 | 2 | 2 | 2 | 2 |
| $\alpha$ | 90.6 | 89.2 | 89.1 | 89.3 | 85.4 | 90.8 | 88.6 | 87.3 | 88.2 | 88.1 | 87.8 | 89 | 90.2 |
| $T_G$ | 475 | 508 | 487 | 478 | 465 | 514 | 465 | 462 | 453 | 462 | 477 | 472 | 472 |
| $L_T$ | 1000 | 1015 | 1015 | 1018 | 1020 | 1045 | 1035 | 1037 | 1022 | 1017 | 993 | 1031 | 1021 |
| $T_G/L_T$ | 0.475 | 0.501 | 0.480 | 0.470 | 0.456 | 0.445 | 0.497 | 0.448 | 0.452 | 0.445 | 0.465 | 0.463 | 0.462 |
| $\sigma$ | 3.63 | 3.46 | 3.46 | 3.65 | 3.72 | 3.58 | 3.67 | 3.45 | 3.57 | 3.47 | 3.54 | 3.44 | 3.49 |

| Ex. No. | 14 | 15 | 16 | 17 | 18 | 19 | 20 | 21 | 22 | 23 | 24 | 25 | 26 |
|---|---|---|---|---|---|---|---|---|---|---|---|---|---|
| Melt No | 2 | 6 | 43 | 48 | 49 | 50 | 51 | 53 | 54 | 55 | 60 | 71 | 73 |
| $P_2O_5$ | 65 | 65 | 65 | 63 | 63.2 | 64 | 61 | 62 | 66 | 63.5 | 62.7 | 65 | 65 |
| $Li_2O$ | 15 | 10 | 10 | 12 | 11.3 | 10 | 10 | 11 | 10 | 10 | 11.7 | 10 | 10 |
| $Na_2O$ | | | | | | | | | | | | | |
| MgO | 10 | 13 | | | | | | | | | | 5 | 5 |
| RO | | | | | | | | | | | | | |
| ZnO | | | 15 | 15 | 15 | 15 | 15 | 15 | 15 | 15 | 15 | 10 | 10 |
| $Al_2O_3$ | 7 | 9 | 7 | 7 | 7 | 8 | 8 | 8 | 6 | 6 | 6 | 6 | 6 |
| $La_2O_3$ | | | 1 | 1 | 1 | 1 | 1 | 1 | 1 | 1 | 1 | 2 | |
| $R_2O_3$ | | | | | 1.3* | 3* | 1* | | 2.5* | | 2+ | | |
| $Nd_2O_3$ | 3 | 3 | 2 | 2 | 2 | 2 | 2 | 2 | 2 | 2 | 2 | 2 | 2 |
| $\alpha$ | 90.1 | 84.9 | 88.0 | 101 | 89.6 | 91.3 | 88.7 | 94.2 | 92.4 | 91.6 | 92.5 | 94 | 84.7 |
| $T_g$ | 494 | 528 | 460 | 454 | 456 | 472 | 470 | 465 | 454 | 460 | 443 | 470 | 470 |
| $L_t$ | 1045 | 1076 | 1050 | 1043 | 1044 | 1053 | 1032 | 1045 | 1037 | 1030 | 1005 | 1005 | 1014 |
| $T_g/L_t$ | .473 | .491 | .438 | .435 | .437 | .448 | .455 | .445 | .438 | .447 | .441 | .468 | .464 |
| $\sigma$ | | | 3.69 | 3.76 | 3.26 | 3.41 | 3.06 | 3.33 | 3.94 | 3.73 | 3.65 | 3.52 | 3.55 |

*$B_2O_3$
+$Y_2O_3$

Additional modifications have been considered in larger scale operations, such as replacement of a portion capable of dissolving platinum inclusions into it melt.

* * * * *